US008372656B2

(12) United States Patent
Kim et al.

(10) Patent No.: US 8,372,656 B2
(45) Date of Patent: Feb. 12, 2013

(54) HYDRODYNAMIC FILTER, FILTERING APPARATUS INCLUDING THE SAME, AND FILTERING METHOD USING THE HYDRODYNAMIC FILTER

(75) Inventors: Minseok S. Kim, Yongin-si (KR); Taeseok Sim, Seoul (KR); Jongmyeon Park, Incheon (KR); Jeong-Gun Lee, Seoul (KR); Hun Joo Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/283,636

(22) Filed: Oct. 28, 2011

(65) Prior Publication Data

US 2012/0138540 A1 Jun. 7, 2012

(30) Foreign Application Priority Data

Dec. 3, 2010 (KR) ........................ 10-2010-0122926

(51) Int. Cl.

| | |
|---|---|
| ***B01D 29/50*** | (2006.01) |
| ***B01D 37/00*** | (2006.01) |
| ***B01D 29/44*** | (2006.01) |
| ***B01D 29/00*** | (2006.01) |
| ***B01D 35/00*** | (2006.01) |

(52) U.S. Cl. ..................... 436/177; 436/174; 435/288.6; 435/287.1; 435/283.1; 435/4; 210/702; 210/492; 210/323.1; 210/767; 210/336; 210/340

(58) Field of Classification Search .................. 436/177, 436/174; 435/288.6, 287.1, 283.1, 69, 4
See application file for complete search history.

(56) References Cited

U.S. PATENT DOCUMENTS

| | | | | |
|---|---|---|---|---|
| 4,963,498 | A * | 10/1990 | Hillman et al. | 436/69 |
| 6,664,104 | B2 * | 12/2003 | Pourahmadi et al. | 435/288.6 |
| 7,390,388 | B2 | 6/2008 | Childers et al. | |
| 2005/0106756 | A1 | 5/2005 | Blankenstein et al. | |
| 2006/0011480 | A1 | 1/2006 | Sano et al. | |
| 2007/0026381 | A1 * | 2/2007 | Huang et al. | 435/4 |
| 2007/0187250 | A1 | 8/2007 | Huang et al. | |
| 2007/0202536 | A1 | 8/2007 | Yamanishi et al. | |

FOREIGN PATENT DOCUMENTS

| | | | |
|---|---|---|---|
| JP | 63-075639 | A | 4/1988 |
| JP | 2009-109232 | A | 5/2009 |
| KR | 10-2005-0096489 | A | 10/2005 |
| KR | 10-2008-0052036 | A | 6/2008 |

* cited by examiner

*Primary Examiner* — Christine T Mui
(74) *Attorney, Agent, or Firm* — Leydig, Voit & Mayer, Ltd.

(57) ABSTRACT

A hydrodynamic filter includes a first portion, and a second portion which is spaced apart from and faces the first portion. The first portion includes a plurality of protrusions protruding in a first direction, and the second portion includes a plurality of protrusions protruding in a second direction opposite to the first direction. A filtering apparatus including a body which includes a plurality of the hydrodynamic filters and filters a fluid including target molecules, an inlet portion in connection with the body, and an outlet portion in connection with the body.

23 Claims, 11 Drawing Sheets

HYDRODYNAMIC FILTER, FILTERING APPARATUS INCLUDING THE SAME, AND FILTERING METHOD USING THE HYDRODYNAMIC FILTER

CROSS-REFERENCE TO RELATED APPLICATIONS

This application claims the benefit of Korean Patent Application No. 10-2010-0122926, filed on Dec. 3, 2010, in the Korean Intellectual Property Office, the disclosure of which is incorporated herein in its entirety by reference.

BACKGROUND

1. Field

Provided is a hydrodynamic filter, a filtering apparatus including the same, and a filtering method using the hydrodynamic filter.

2. Description of the Related Art

Target molecules may be detected by using properties of the target molecules, for example, sizes or masses of the target molecules. Target molecules may be labelled and then may be detected by using a probe. Alternatively, target molecules may be stained and then may be detected. When target molecules are detected by using sizes of the target molecules, a filter, particularly, a hydrodynamic filter may be used. A hydrodynamic filter is a system for capturing target molecules included in a fluid by using a flow of the fluid.

SUMMARY

Additional aspects will be set forth in part in the description which follows and, in part, will be apparent from the description, or may be learned by practice of the presented embodiments.

Provided is a hydrodynamic filter which includes: a first portion; and a second portion which is spaced apart from and faces the first portion. The first portion includes a plurality of protrusions protruding in a first direction, and the second portion includes a plurality of protrusions protruding in a second direction opposite to the first direction. The plurality of protrusions of the first portion faces the plurality of protrusions of the second portion.

The plurality of protrusions of the first portion may include a first protrusion and a second protrusion which are spaced apart from each other, and the plurality of protrusions of the second portion may include a third protrusion and a fourth protrusion which are spaced apart from each other and respectively face the first protrusion and the second protrusion.

The plurality of protrusions of the first portion and the plurality of protrusions of the second portion may be tapered toward ends thereof.

A surface of the first portion between the plurality of protrusions of the first portion and a surface of the second portion between the plurality of protrusions of the second portion may be curved.

A first distance between the first protrusion and the third protrusion ranges from about 5 micrometers (μm) to about 100 μm.

A second distance between the second protrusion and the fourth protrusion may range from about 5 μm to about 100 μm.

A first distance between the first protrusion and the third protrusion may be greater than or equal to a second distance between the second protrusion and the fourth protrusion.

The first protrusion and the third protrusion may be flexible, such that the first and third flexible protrusions deform when a fluid and target molecules flow therebetween.

The plurality of protrusions of the first portion may further include a fifth protrusion which is spaced apart from the first and second protrusions, and the plurality of protrusions of the second portion may further include a sixth protrusion which is spaced apart from the third and fourth protrusions and faces the fifth protrusion.

A third distance between the fifth protrusion and the sixth protrusion may be less than or equal to a second distance between the second protrusion and the fourth protrusion.

Provided is a filtering apparatus which includes: a body which includes a plurality of the hydrodynamic filters and filters the fluid including the target molecules; an inlet portion which is in connection to the body and through which the fluid is introduced into the body; and an outlet portion which is in connection to the body and through which the fluid filtered by the body is discharged from the body.

The plurality of hydrodynamic filters may be aligned to form a hydrodynamic filter sequence.

The plurality of hydrodynamic filters may be arrayed.

A plurality of the hydrodynamic filter sequences may be used, and the plurality of hydrodynamic filter sequences may be spaced apart from one another to be parallel to one another in a direction from the inlet portion to the outlet portion.

Distances between facing protrusions of the hydrodynamic filters included in the plurality of the hydrodynamic filter sequences may decrease in the direction from the inlet portion toward the outlet portion.

The plurality of the hydrodynamic filter sequences may extend from a first side wall of the body completely to a second side wall of the body.

The plurality of the hydrodynamic filter sequences may extend from a first side wall of the body to be spaced apart from a second side wall of the body.

The plurality of the hydrodynamic filter sequences may include first hydrodynamic filter sequences which extend from a first side wall of the body to be spaced from a second side wall of the body, and second hydrodynamic filter sequences which extend from the second side wall of the body to be spaced apart from the first side wall of the body. The first and second hydrodynamic filter sequences are alternately disposed.

Provided is a filtering method which includes: introducing a fluid including target molecules into the hydrodynamic filter; capturing the target molecules by the hydrodynamic filter; and discharging a remaining part of the fluid without the captured target molecules to the outside of the hydrodynamic filter.

Before the introducing of the fluid into the hydrodynamic filter, the filtering method may further include attaching beads to the target molecules.

Provided is a filtering method which includes: introducing the fluid including the target molecules through the inlet portion and into the body of the filtering apparatus; capturing the target molecules by the hydrodynamic filter included in the body; and discharging a remaining part of the fluid without the captured target molecules to the outside of the filtering apparatus through the outlet portion.

Before the introducing of the fluid into the filtering apparatus, the filtering method may further include attaching beads to the target molecules.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1A:
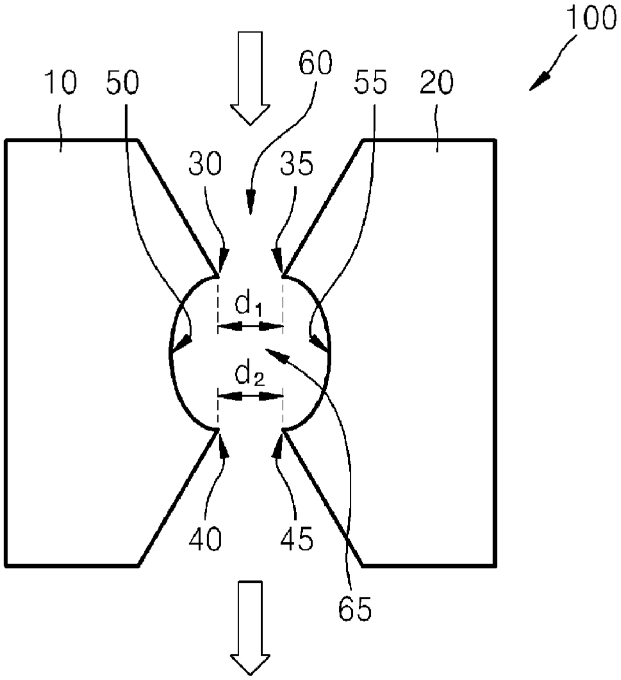
FIGS. 1A and 1B are plan views of a hydrodynamic filter according to an embodiment of the present invention.

Various embodiments will now be described more fully with reference to the accompanying drawings in which some embodiments are shown.

Detailed illustrative embodiments are disclosed herein. However, specific structural and functional details disclosed herein are merely representative for purposes of describing embodiments. This invention may, however, may be embodied in many alternate forms and should not be construed as limited to only the embodiments set forth herein.

Accordingly, while embodiments are capable of various modifications and alternative forms, embodiments thereof are shown by way of example in the drawings and will herein be described in detail. It should be understood, however, that there is no intent to limit embodiments to the particular forms disclosed, but on the contrary, embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of embodiments. As used herein, the term "and/or," includes any and all combinations of one or more of the associated listed items.

It will be understood that when an element or layer is referred to as being "formed on," another element or layer, it can be directly or indirectly formed on the other element or layer. That is, for example, intervening elements or layers may be present. In contrast, when an element or layer is referred to as being "directly formed on," relative to another element, there are no intervening elements or layers present. Other words used to describe the relationship between elements or layers should be interpreted in a like fashion (e.g., "between," versus "directly between," "adjacent," versus "directly adjacent," etc.).

The terminology used herein is for the purpose of describing particular embodiments only and is not intended to be limiting of the embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In the drawings, the thicknesses of layers and regions are exaggerated for clarity. Like reference numerals in the drawings denote like elements.

The present invention will now be described more fully with reference to the accompanying drawings, in which embodiments of the invention are shown. In the drawings, the same reference numerals denote the same elements, and sizes of elements may be exaggerated for clarity and convenience.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Figure 1B:
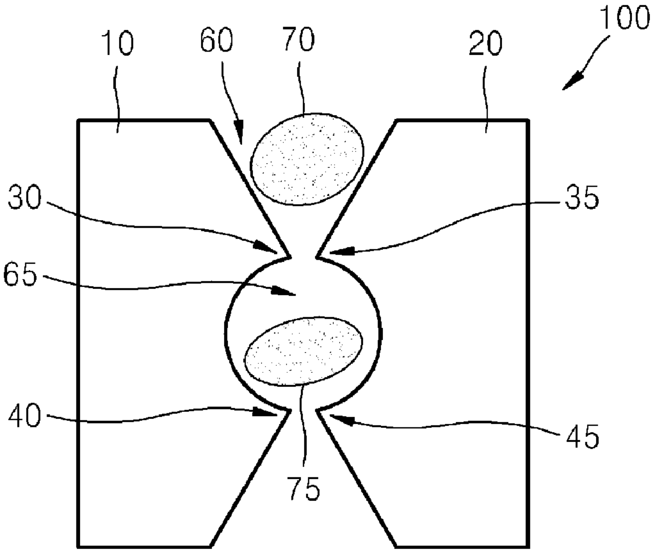

FIG. 1A is a plan view of a hydrodynamic filter 100 according to an embodiment of the present invention. FIG. 1B is a plan view illustrating a case where target molecules are captured by the hydrodynamic filter 100 of FIG. 1A.

Referring to FIG. 1A, the hydrodynamic filter 100 may include a first portion 10, and a second portion 20 that is spaced apart from the first portion 10 to face the first portion 10. The first portion 10 may include a plurality of protrusions, for example, first and second protrusions 30 and 40, protruding in a first direction, and the first direction may be a direction in which the first portion 10 faces the second portion 20. The second portion 20 may include a plurality of protrusions, for example, third and fourth protrusions 35 and 45, protruding in a second direction, that is, toward the first portion 10. The third and fourth protrusions 35 and 45 of the second portion 20 may be disposed to correspond to the first and second protrusions 30 and 40 of the first portion 10, respectively. As illustrated in FIG. 1A, the first protrusion 30 faces or is aligned with the third protrusion 35, and the second protrusion 40 faces or is aligned with the fourth protrusion 45.

Each of the first portion 10 and the second portion 20 may include a silicon-based polymer material or a polymer material, for example, polydimethylsiloxane ("PDMS") or parylene. Also, each of the first portion 10 and the second portion 20 may include a silicon wafer, and for example, may be formed by etching the silicon wafer. In one embodiment, for example, each of the first portion 10 and the second portion 20 may be formed by etching a silicon-on-glass ("SOG") wafer. The first portion 10 and/or the second portion 20 may be a single, unitary, indivisible member.

The plurality of protrusions of the first portion 10 may include the first protrusion 30 and the second protrusion 40, which are spaced apart from each other. The plurality of protrusions of the second portion 20 may include the third protrusion 35 and the fourth protrusion 45, which are spaced apart from each other. Here, the first protrusion 30 and the third protrusion 35 may be spaced apart from each other to face each other, and a first distance $d_1$ between the first protrusion 30 and the third protrusion 35 may be adjusted according to sizes of target molecules to be filtered. The first distance $d_1$ between the first protrusion 30 and the third protrusion 35 may range from several micrometers (μm) to several hundred micrometers (μm). In one embodiment, for example, the first distance $d_1$ may range from about 1 μm to about 500 μm, and particularly, the first distance $d_1$ may range from about 5 μm to about 100 μm.

The second protrusion 40 and the fourth protrusion 45 may also be spaced apart from each other to face each other. A second distance $d_2$ between the second protrusion 40 and the fourth protrusion 45 may be adjusted according to sizes of target molecules to be captured. The second distance $d_2$ between the second protrusion 40 and the fourth protrusion 45 may range from several μm to several hundred μm. In one embodiment, for example, the second distance $d_2$ may range from about 1 μm to about 500 μm, and particularly, the second distance $d_2$ may range from about 5 μm to about 100 μm.

The first distance $d_1$ between the first protrusion 30 and the third protrusion 35 may be greater than or equal to the second distance $d_2$ between the second protrusion 40 and the fourth protrusion 45. A size of the hydrodynamic filter 100 may refer to the first distance $d_1$ between the first protrusion 30 and the third protrusion 35 or the second distance $d_2$ between the second protrusion 40 and the fourth protrusion 45.

The hydrodynamic filter 100 may include a first capturing portion 60 and a second capturing portion 65. A fluid including target molecules may be introduced in a direction indicated by an arrow on an upper side of FIG. 1A, and may be discharged in a direction indicated by an arrow on a lower side of FIG. 1A. The target molecules may be captured by at least one of the first capturing portion 60 and the second capturing portion 65. Accordingly, since the hydrodynamic filter 100 includes more structures capable of capturing target molecules than a comparative filter having one capturing structure, target molecules are more likely to be captured in the hydrodynamic filter 100 than in the comparative filter.

The first capturing portion 60 may be formed by the first protrusion 30 and the third protrusion 35, and may capture target molecules. The first protrusion 30 and the third protrusion 35 may be tapered toward ends thereof, so that the target molecules may be easily filtered by the first capturing portion 60. That is, target molecules included in a fluid may be supported by the first capturing portion 60 so as not to leak out of the hydrodynamic filter 100 along with the fluid. Also, although the distal ends of the first protrusion 30 and the third protrusion 35 are sharp, the present embodiment is not limited thereto. That is, the distal ends of the first protrusion 30 and the third protrusion 35 may be blunt as shown in FIG. 2B. In this case, while target molecules pass between the blunt ends of the first protrusion 30 and the third protrusion 35, a speed of the target molecules may be reduced due to a friction force.

The second capturing portion 65 may be formed by the second protrusion 40 and the fourth protrusion 45, and may also capture target molecules. The second protrusion 40 and the fourth protrusion 45 may be tapered toward ends thereof, so that the target molecules may be easily filtered by the second capturing portion 65. That is, target molecules included in a fluid may be supported by the second capturing portion 65 so as not to leak out of the hydrodynamic filter 100 along with the fluid. Also, the distal ends of the second protrusion 40 and the fourth protrusion 45 may be sharp.

A space between the first protrusion 30 and the second protrusion 40 and a space between the third protrusion 35 and the fourth protrusion 45 may be defined by curved surfaces 50 and 55 extended between the respective pair or protrusions, and thus a space of the second capturing portion 65 is increased, and damage to target molecules to be captured due to contact may be reduced or effectively prevented.

Also, since the second capturing portion 65 may be formed by not only the second protrusion 40 and the fourth protrusion 45 but also by the first protrusion 30 and the third protrusion 35, the second capturing portion 65 may capture target molecules more easily. That is, even when a fluid leaking out of the hydrodynamic filter 100 flows backward through the hydrodynamic filter 100, the first protrusion 30 and the third protrusion 35 may support captured target molecules. Accordingly, leaking out of the captured target molecules from the hydrodynamic filter 100 along with the fluid is reduced or effectively prevented.

Also, if the second distance $d_2$ between the second protrusion 40 and the fourth protrusion 45 is less than the first distance $d_1$ between the first protrusion 30 and the third protrusion 35, target molecules are more likely to be captured and it is more likely that only a fluid exits from the hydrodynamic filter 100. Also, target molecules with different sizes of target molecules may be captured by the first and second capturing portions 60 and 65. The first capturing portion 60 formed by the first protrusion 30 and the third protrusion 35 and the second capturing portion 65 formed by the second protrusion 40 and the fourth protrusion 45 may be hereinafter referred to as obstacle structures. Accordingly, the hydrodynamic filter 100 may include multiple obstacle structures.

Referring to FIG. 1B, the first capturing portion 60 and the second capturing portion 65 of the hydrodynamic filter 100 capture target molecules 70 and 75, respectively. Target molecules to be filtered by the hydrodynamic filter 100 may be various biological molecules. Biological molecules may include various cells such as cancer cells, red blood cells ("RBCs"), white blood cells ("WBCs"), phagocytes, animal cells, and plant cells. Also, biological molecules may include various biomolecules constituting a living organism, such as proteins, lipids, deoxyribonucleic acid ("DNA"), and ribonucleic acid ("RNA"), but the present invention is not limited thereto. If target molecules are biological molecules, since sizes of the biological molecules range from several nanometers (nm) to several hundred nanometers (nm), a size of the hydrodynamic filter 100 may range from several nm to several hundred nm. Here, circulating tumor cells ("CTCs") included in blood are exemplarily illustrated as the target molecules 70 and 75. The number of CTCs may be so small that only one CTC is detected from among about $10^9$ cells. In one embodiment, for example, in the case of breast cancer, about 5 CTCs or less may be detected in about 7.5 milliliters (ml) of blood, and in the case of colon cancer, 3 CTCs or less may be detected in about 7.5 ml of blood. Accordingly, it is very important to capture such a small number of CTCs without loss. Also, since CTCs are easily destructed, external environmental factors that may destruct CTCs should be minimized.

Since the hydrodynamic filter 100 may capture the target molecules 70 and 75 respectively in the first capturing portion 60 and the second capturing portion 65, target molecules are more likely to be captured. That is, since CTCs are surrounded by flexible cell membranes, the CTCs may be deformed to some extent. The target molecules 70, which represent undeformed CTCs, may be captured by the first capturing portion 60, and the target molecules 75, which represent deformed CTCs, may be captured by the second capturing portion 65, thereby reducing the number of CTCs that are not filtered, that is, CTCs that are lost. Since the hydrodynamic filter 100 may filter only desired target molecules, a time taken to analyze target molecules may be reduced. Also, since there is no need to re-separate the desired target molecules from other molecules, efficiency and convenience may be improved.

FIGS. 2A through 4 are plan views illustrating hydrodynamic filters 110, 115, 120, and 130 that are various modifications of the hydrodynamic filter 100 of FIG. 1A. The following explanation will be focused on differences between the hydrodynamic filter 100 and the hydrodynamic filters 110, 115, 120, and 130.

Figure 2A:
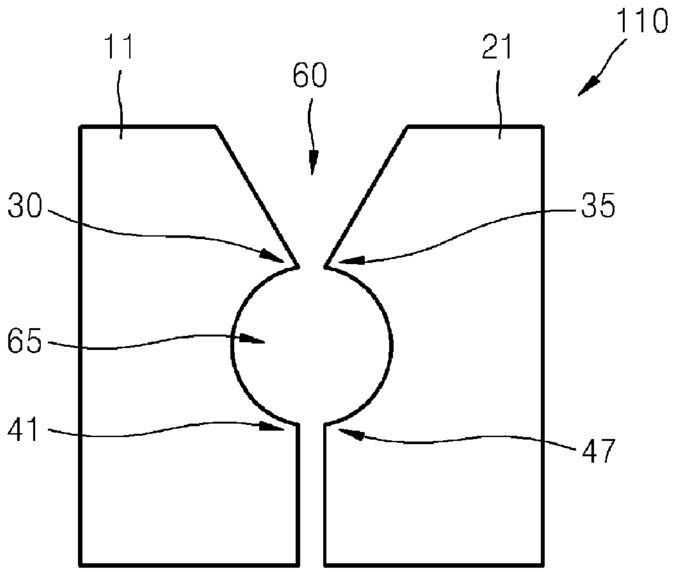
FIGS. 2A through 4 are plan views of hydrodynamic filters that are various modifications of the hydrodynamic filter of FIG. 1A.
Figure 2B:
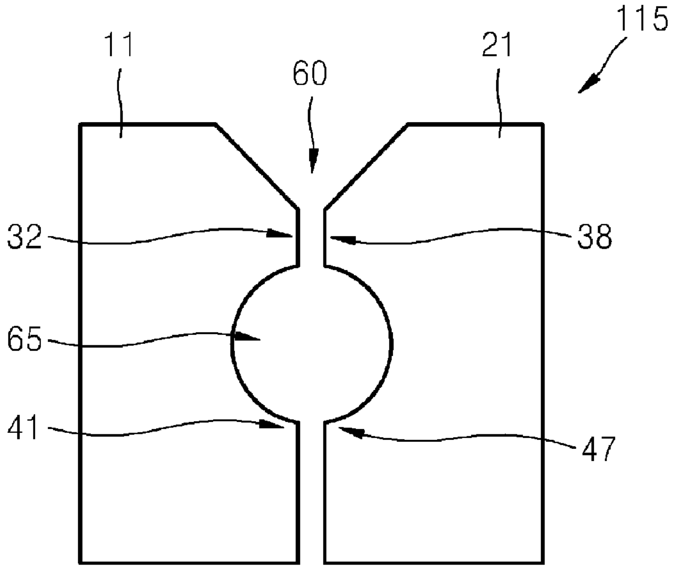

Referring to FIG. 2A, distal ends of a second protrusion 41 of a first portion 11 and a fourth protrusion 47 of a second portion 21 of the hydrodynamic filter 110 are not sharp but flat to form a path therebetween with a width less than sizes of target molecules. Accordingly, bowing to a pressure of an introduced fluid and passing through the hydrodynamic filter 110 along with the fluid of target molecules captured by the second capturing portion 65 may be reduced or effectively prevented. Only the fluid from which the target molecules are removed may be discharged through the path.

Referring to FIG. 2B, the second protrusion 41 and the fourth protrusion 47 of the hydrodynamic filter 115 have the same shapes as those of the second protrusion 41 and the fourth protrusion 47 of the hydrodynamic filter 110 of FIG. 2A. However, unlike in FIG. 2A, distal ends of a first protrusion 32 and a third protrusion 38 of the hydrodynamic filter 115 are not sharp but blunt. In this case, while target molecules pass between the blunt distal ends of the first protrusion 32 and the third protrusion 38, a speed of the target molecules may be reduced due to a friction force. Also, leaking out when a fluid flows backward of target molecules captured by the second capturing portion 65 may be reduced or effectively prevented.

Figure 3:
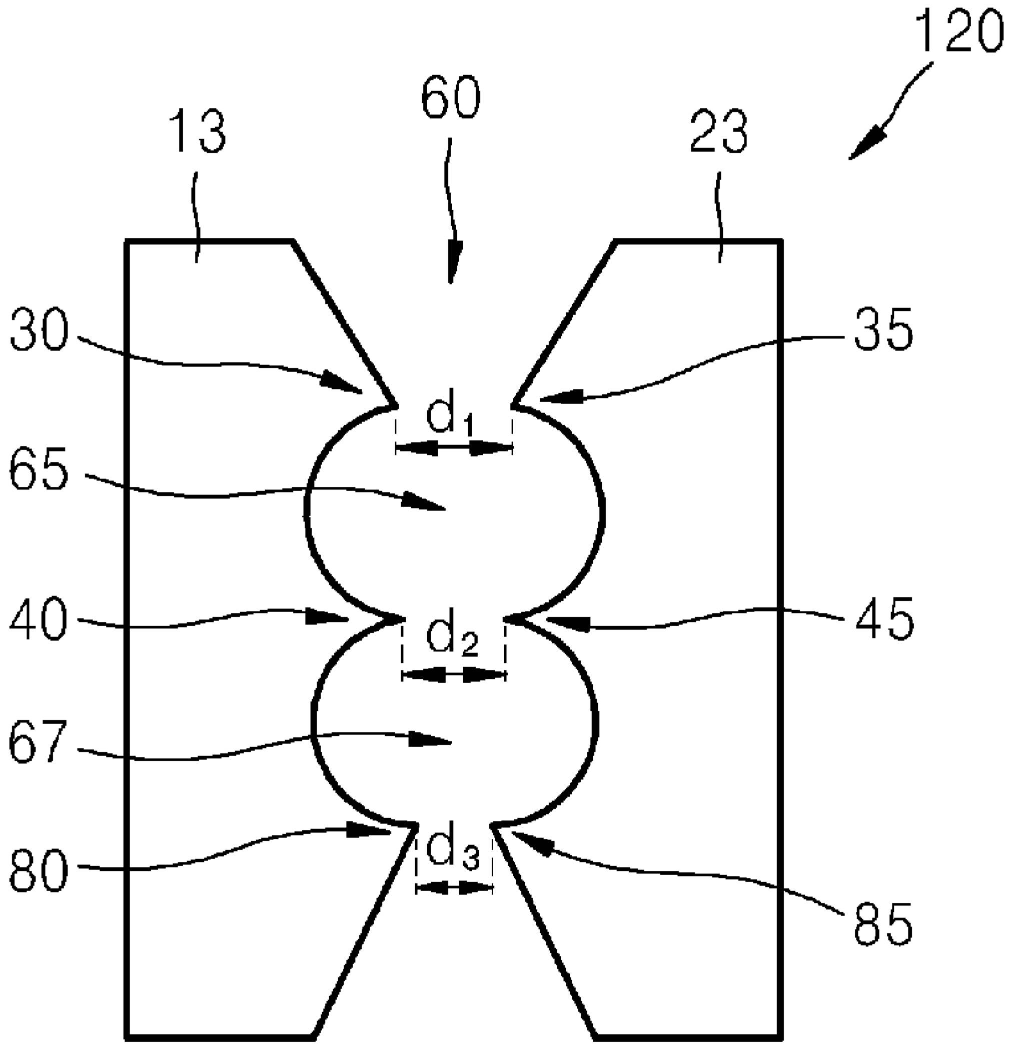

Referring to FIG. 3, a first portion 13 of the hydrodynamic filter 120 may further include a fifth protrusion 80 that is spaced apart from the first protrusion 30 and the second protrusion 40. A second portion 23 may further include a sixth protrusion 85 that is spaced apart from the third protrusion 35 and the fourth protrusion 45 to face the fifth protrusion 80. Here, the fifth protrusion 80 and the sixth protrusion 85 may be spaced apart from each other to face each other, and a third distance $d_3$ between the fifth protrusion 80 and the sixth protrusion 85 may be adjusted according to sizes of target molecules to be filtered. The third distance $d_3$ between the fifth protrusion 80 and the sixth protrusion 85 may range from several μm to several hundred μm. In one embodiment, for example, the third distance $d_3$ may range from about 1 μm to about 500 μm, and particularly, the third distance $d_3$ may range from about 5 μm to about 100 μm.

The third distance $d_3$ may be less than or equal to at least one of the first distance $d_1$ between the first protrusion 30 and the third protrusion 35 and the second distance $d_2$ between the second protrusion 40 and the fourth protrusion 45. In one embodiment, for example, the first distance $d_1$, the second distance $d_2$, and the third distance $d_3$ may be equal to one another. The first distance $d_1$, the second distance $d_2$, and the third distance $d_3$ may be arranged in a decreasing order from a first (e.g., inlet) end of the hydrodynamic filter 120 to a second (e.g., outlet) end opposite the first end. In this case, target molecules are more likely to be captured by the hydrodynamic filter 120, and target molecules with different sizes may be captured by the capturing portions 60 and 65, and a third capturing portion 67.

The third capturing portion 67 may be formed by the fifth protrusion 80 and the sixth protrusion 85, and may also capture target molecules. The fifth protrusion 80 and the sixth protrusion 85 may be tapered, so that the target molecules may be easily filtered by the third capturing portion 67. That is, target molecules included in a fluid may be supported by the third capturing portion 65 so as not to leak out of the hydrodynamic filter 120 along with the fluid. Also, distal ends of the fifth protrusion 80 and the sixth protrusion 85 may be sharp. A space between the second protrusion 40 and the fifth protrusion 80 and a space between the fourth protrusion 45 and the sixth protrusion 85 may have curved surfaces, and thus a space of the third capturing portion 67 may be increased and damage to target molecules to be captured due to contact with inside walls of the hydrodynamic filter 120 may be reduced or effectively prevented. The third capturing portion 67 formed by the fifth protrusion 80 and the sixth protrusion 85 may be referred to as an obstacle structure. Accordingly, the hydrodynamic filter 120 may include multiple obstacle structures.

Figure 4:
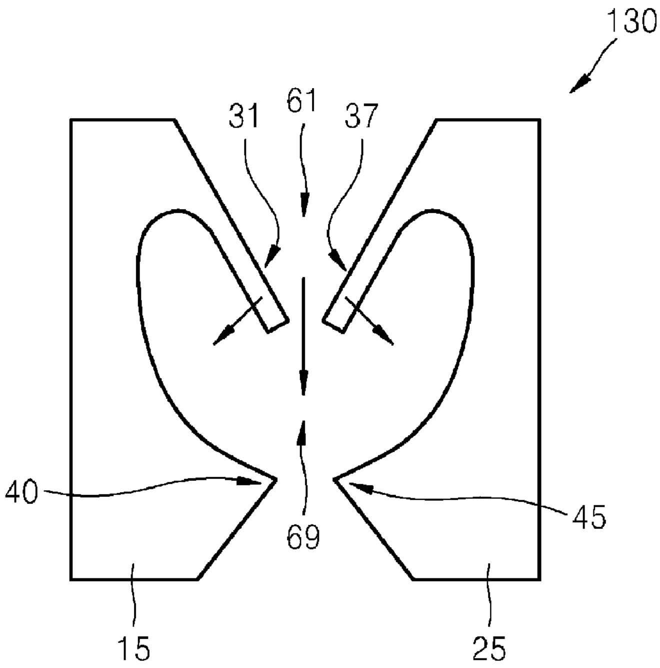

Referring to FIG. 4, a first portion 15 of the hydrodynamic filter 130 may include a flexible first protrusion 31, and a second portion 25 of the hydrodynamic filter 130 may include a flexible third protrusion 37. The first protrusion 31 and the third protrusion 37 may longitudinally extend to define a first capturing portion 61. Also, the first protrusion 31 and the third protrusion 37 may longitudinally extend and may be spaced apart from each other to form a structure in which a fluid and target molecules may be easily introduced, that is, a second capturing portion 69. Like valves of a heart, the second capturing portion 69 may enable target molecules to be easily introduced into the second capturing portion 69 while preventing target molecules captured by the second capturing portion 69 from moving backward and leaking out of the second capturing portion 69. Accordingly, after target molecules are captured by the second capturing portion 69, it is easy to perform an additional process of flowing another fluid through the hydrodynamic filter 130. In one embodiment, for example, after CTCs are captured by the second capturing portion 69, it is easy to flow other various fluids to perform a staining process.

Figure 5A:
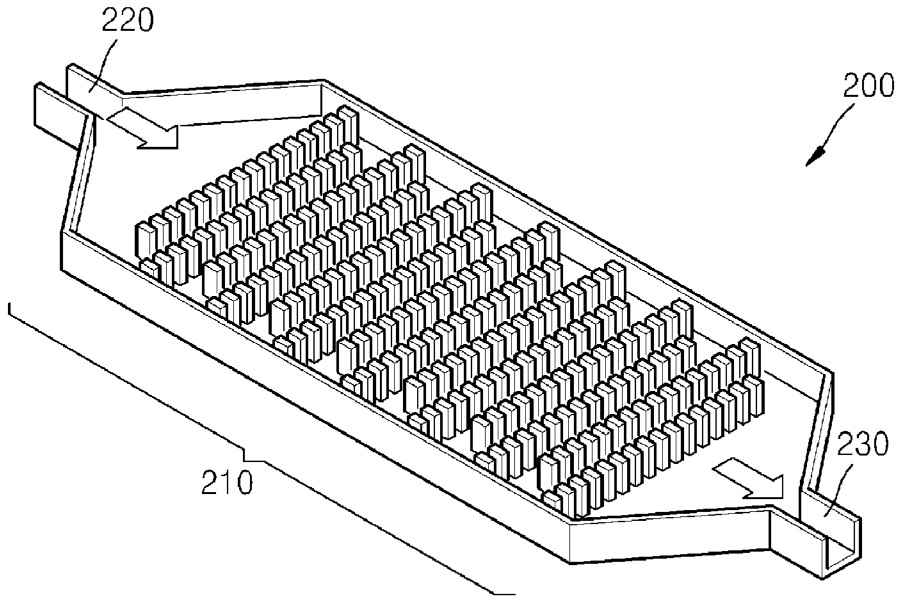
FIG. 5A is a perspective view of a filtering apparatus including a hydrodynamic filter, according to an embodiment of the present invention.
Figure 5B:
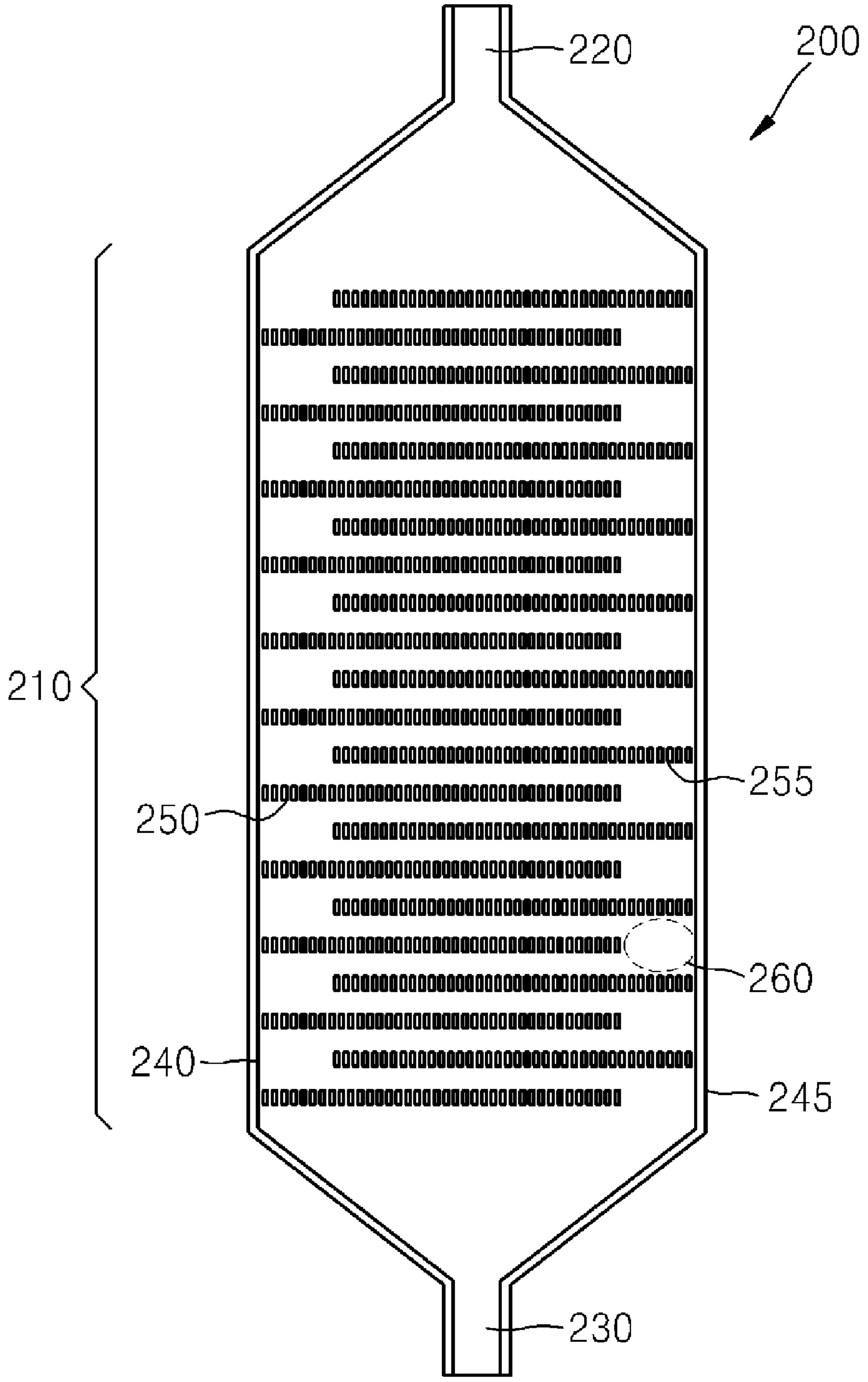
FIG. 5B is a plan view of the filtering apparatus of FIG. 5A.

FIG. 5A is a perspective view of a filtering apparatus 200 including a hydrodynamic filter, according to an embodiment of the present invention. FIG. 5B is a plan view of the filtering apparatus 200 of FIG. 5A.

Referring to FIGS. 5A and 5B, the filtering apparatus 200 including the hydrodynamic filter may include a body 210, and an inlet portion 220 and an outlet portion 230 that are fluidly and/or physically connected to the body 210. The inlet portion 220 and the outlet portion 230 may be disposed to face each other with the body 210 therebetween. The inlet portion 220 may be fluidly and/or physically connected to an external source (not shown) with a hose or the like so that target molecules and a fluid may be introduced into the body 210 through the inlet portion 220. When a predetermined pressure is applied to the inlet portion 220, the fluid may flow through the filtering apparatus 200. The inlet portion 220 may be of a tube type, and a portion of the inlet portion 220 connected to the body 210 may be widened toward the body 210. The outlet portion 230 may allow a fluid filtered by the filtering apparatus 200 to be discharged to the outside therethrough, and the filtered fluid may again be introduced into the inlet portion 220 and may again be filtered by the filtering apparatus 200. The outlet portion 230 may also be of a tube type and a portion of the outlet portion 230 connected to the body 210 may be widened toward the body 210.

The body 210 may include an upper substrate (not shown), a lower substrate, and side walls 240 and 245. The body 210 may have a first end connected to the inlet portion 220 and a second end opposite to the first end connected to the outlet portion 230. The body 210 may include a plurality of the hydrodynamic filters 100 shown in FIGS. 1A and 1B. The hydrodynamic filters 100 may filter target molecules from a fluid introduced into the body 210. Groups of the plurality of hydrodynamic filters 100 may be aligned to form hydrodynamic filter sequences, for example, first and second hydrodynamic filter sequences 250 and 255.

The body 210 may include the first and second hydrodynamic filter sequences 250 and 255, and the first and second hydrodynamic filter sequences 250 and 255 may be spaced apart from each other to be parallel to each other in a direction from the inlet portion 220 to the outlet portion 230. The first and second hydrodynamic filter sequences 250 and 255 may extend from the first side wall 240 to the second side wall 245. A first end of the first hydrodynamic filter sequence 250 may be adjacent to and extend from the first side wall 240, to be spaced apart from the second side wall 245 at a second end opposite to the first end, and a first end of the second hydrodynamic filter sequence 255 may be adjacent to and extend from the second side wall 245, to be spaced apart from the first side wall 240 at a second end opposite to the first end. A plurality of the first hydrodynamic filter sequences 250 and a plurality of the second hydrodynamic filter sequences 255 may be alternately disposed. Accordingly, bypasses 260 may be disposed between the first side wall 240 and the second hydrodynamic filter sequence 255 and between the second side wall 245 and the first hydrodynamic filter sequence 250.

Alternatively, the body 210 may include both hydrodynamic filter sequences without the bypasses 260 and hydrodynamic filter sequences with the bypasses 260. That is, from among hydrodynamic filter sequences included in the body 210, some may be hydrodynamic filter sequences extending from the first side wall 240 completely to the second side wall 245 and not including the bypasses 260. From among the hydrodynamic filter sequences included in the body 210, remaining ones may be the first hydrodynamic filter sequences 250, which extend from the first side wall 240 to be spaced apart from the second side wall 245, and the second hydrodynamic filter sequences 255, which extend from the second side wall 245 to be spaced apart from the first side wall 240. In this case, the first hydrodynamic filter sequences 250 and the second hydrodynamic filter sequences 255 may include the bypasses 260. A structure of each of the bypasses 260 will be explained in detail with reference to FIGS. 7A through 7C. Also, the plurality of hydrodynamic filters 100 may be arrayed in the body 210. The body 210 may include at least one type of filters selected from the hydrodynamic filters 110, 115, 120, and 130 shown in FIGS. 2A through 4.

Figure 6A:
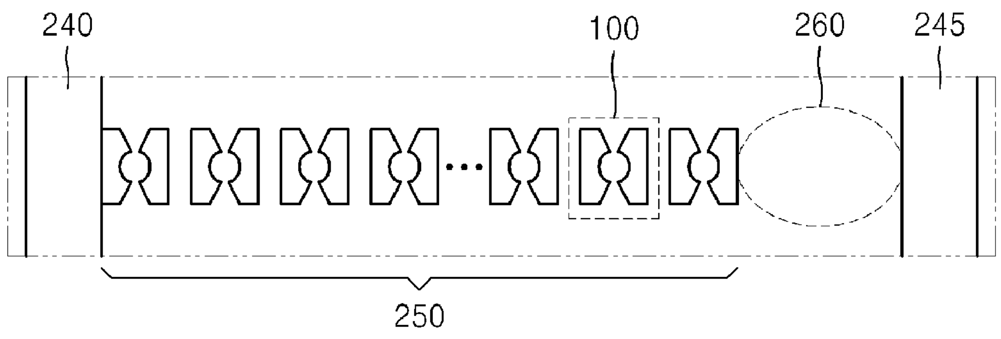
FIGS. 6A and 6B are enlarged views of hydrodynamic filter sequences included in the filtering apparatus of FIG. 5A.
Figure 6B:
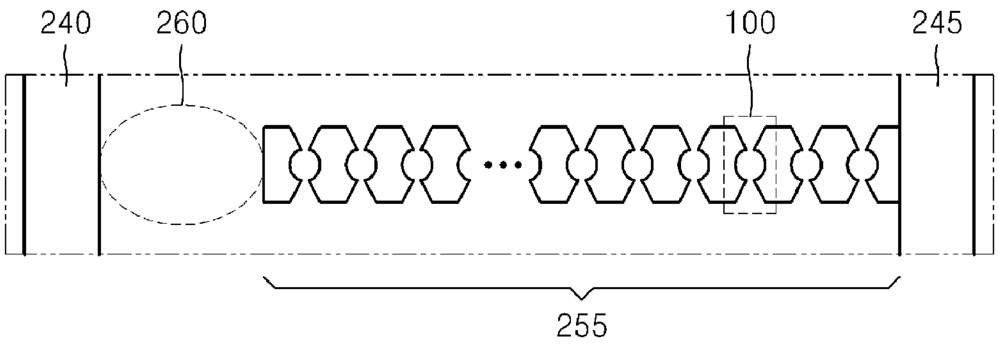

FIGS. 6A and 6B are enlarged views of the hydrodynamic filter sequences 250 and 255 included in the filtering apparatus 200 of FIG. 5A.

Referring to FIG. 6A, each of the first hydrodynamic filter sequences 250 may extend from being adjacent the first side wall 240 toward the second side wall 245 and may include the plurality of hydrodynamic filters 100. That is, the first hydrodynamic filter sequence 250 may include the plurality of hydrodynamic filters 100 spaced apart from one another in a direction perpendicular to a flow direction. A fluid may flow through and between the hydrodynamic filters 100 in the flow direction. The first hydrodynamic filter sequence 250 may extend from being directly adjacent to the first side wall 240 to being directly adjacent to the second side wall 245. Alternatively, the first hydrodynamic filter sequence 250 may extend from being directly adjacent to the first side wall 240 to being spaced apart from the second side wall 245 as shown in FIG. 6A. In this case, a path is formed between the first hydrodynamic filter sequence 250 and the second side wall 245, and may be referred to as the bypass 260. If all of the hydrodynamic filters 100 included in the first hydrodynamic filter sequence 250 capture target molecules or are clogged by other molecules, a fluid may flow through the bypass 260 toward a next hydrodynamic filter sequence or the outlet portion 230 (see FIG. 5B).

Referring to FIG. 6B, each of the second hydrodynamic filter sequences 255 may extend from being adjacent to the second side wall 245 toward the first side wall 240, and may include the plurality of hydrodynamic filters 100. That is, the second hydrodynamic filter sequence 255 may include the plurality of hydrodynamic filters 100 not spaced apart from one another but in contact with one another. That is, the second portion of a left hydrodynamic filter 100 may be a single, unitary, indivisible member with the first portion of a right hydrodynamic filter 100. A fluid may flow through the plurality of hydrodynamic filters 100. The second hydrodynamic filter sequence 255 may extend from being directly adjacent the second side wall 245 to being directly adjacent to the first side wall 240. Alternatively, the second hydrodynamic filter sequence 255 may extend from being directly adjacent to the second side wall 245 to be spaced apart from the first side wall 240 as shown in FIG. 6B. Accordingly, a path may be formed between the second hydrodynamic filter sequence 255 and the first side wall 240 and may be referred to as the bypass 260. If all of the hydrodynamic filters 100 included in the second hydrodynamic filter sequence 255 capture target molecules or are clogged by other molecules, a fluid including target molecules may flow through the bypass 260 toward a next hydrodynamic filter sequence or the outlet portion 230 (see FIG. 5B). Alternative to FIGS. 6A and 6B, the first hydrodynamic filter sequence 250 may include the plurality of hydrodynamic filters 100 not spaced apart from each other but in contact with one another, and the second hydrodynamic filter sequence 255 may include the plurality of hydrodynamic filters 100 spaced apart from one another.

Figure 7A:
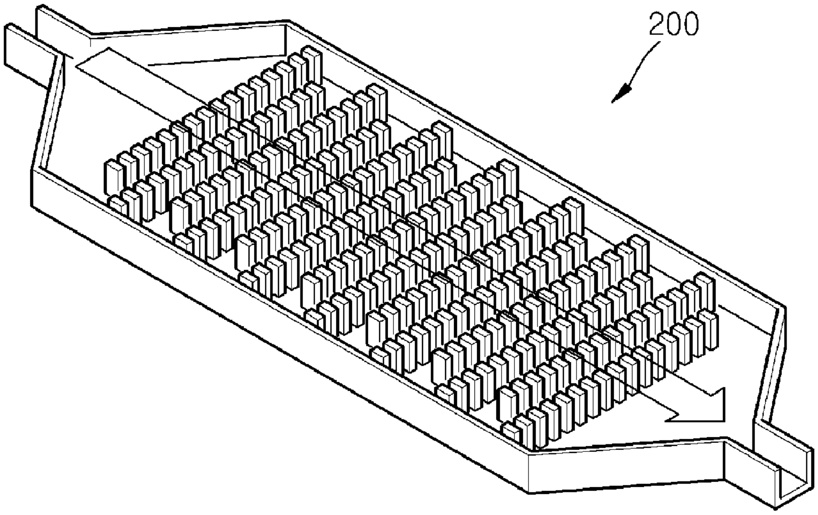
FIGS. 7A through 7C are perspective views illustrating a flow of a fluid in the filtering apparatus of FIG. 5A.
Figure 7B:
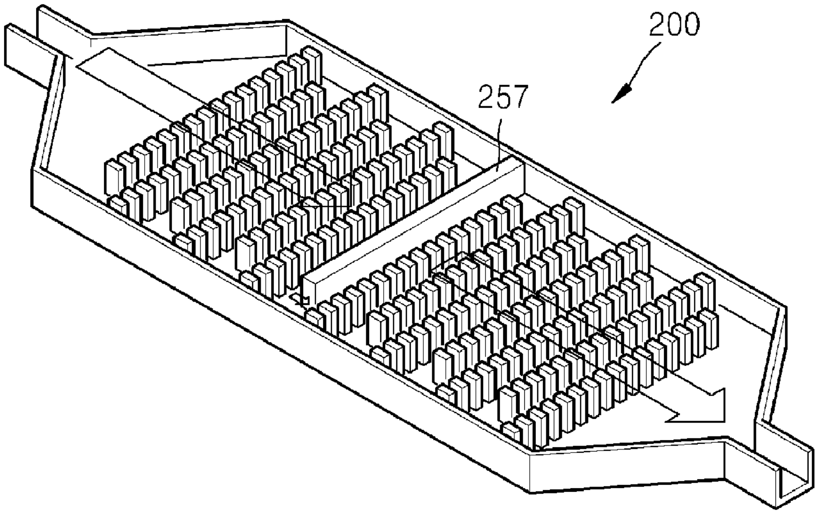
Figure 7C:
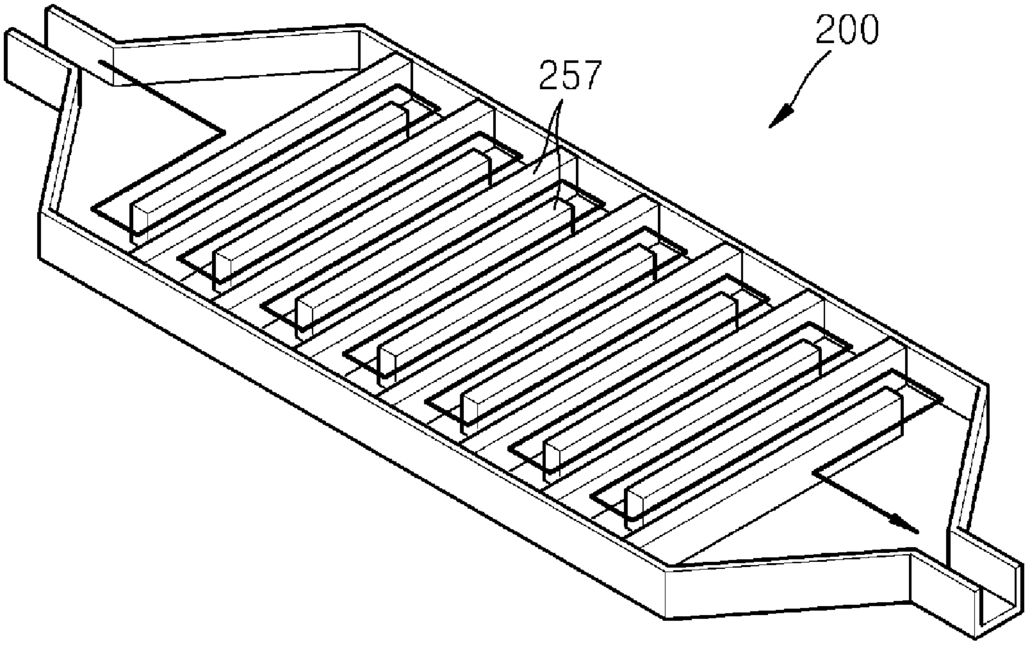

FIGS. 7A through 7C are perspective views illustrating a flow of a fluid in the filtering apparatus 200 of FIG. 5A.

FIG. 7A shows a case where a fluid flows when the hydrodynamic filters 100 included in the first and second hydrodynamic filter sequences 250 and 255 do not capture target molecules and other molecules. Since the fluid may easily flow through the hydrodynamic filters 100, the fluid flows smoothly.

FIG. 7B shows a case where a fluid flows when the hydrodynamic filters 100 included in any one, which is referred to as a hydrodynamic filter sequence 257, of the first and second hydrodynamic filter sequences 250 and 255, which capture target molecules and other molecules. The hydrodynamic filter sequence 257 clogged by the target molecules and the other molecules may form one wall, thereby making it difficult for the fluid to flow. In this case, the fluid may flow through the bypasses 260 formed between the hydrodynamic filter sequence 257 and the first side wall 240 or the second side wall 245. The hydrodynamic filters 100 included in the first and second hydrodynamic filter sequences 250 and 255 except the clogged hydrodynamic filter sequence 257 may continue capturing the target molecules. If there are no bypasses 260 and the hydrodynamic filter sequence 257 is clogged, a fluid may not flow through the filtering apparatus 200, and thus the filtering apparatus 200 may no longer act as a filter. However, the filtering apparatus 200 may prevent such a problem because the filtering apparatus 200 includes the bypasses 260 disposed between the first and second hydrodynamic filter sequences 250 and 255 and the first side wall 240 or the second side wall 245.

FIG. 7C shows a case where a fluid flows when all of the hydrodynamic filters 100 included in the hydrodynamic filter sequence 257 capture target molecules and other molecules. Since all of the hydrodynamic filter sequences 257 are clogged by the target molecules and the other molecules, the fluid flows through the bypasses 260.

Figure 8:
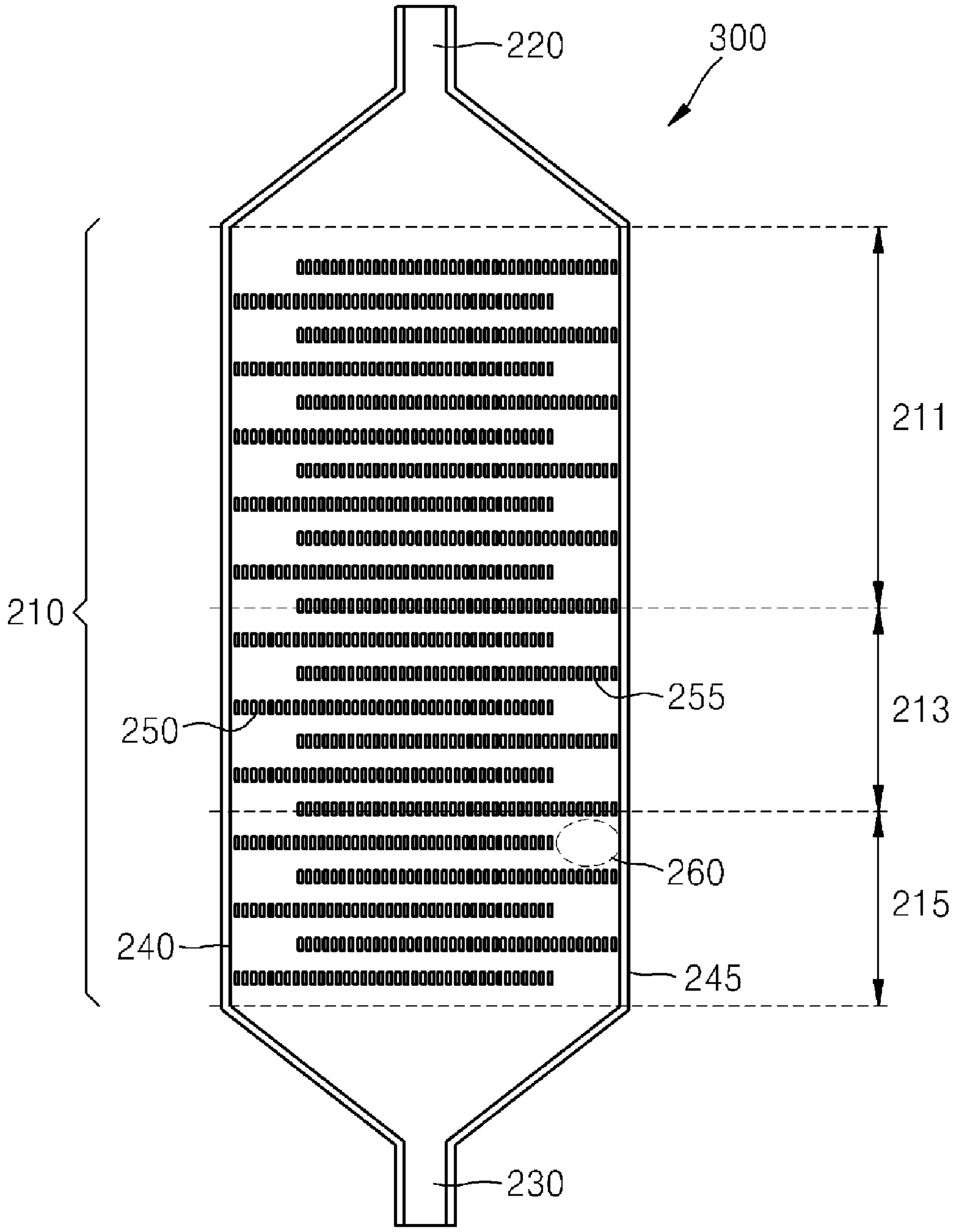
FIG. 8 is a plan view of a filtering apparatus that is a modification of the filtering apparatus of FIG. 5A.

FIG. 8 is a plan view of a filtering apparatus 300 that is a modification of the filtering apparatus 200 of FIG. 5A. The following explanation will be focused on a difference between the filtering apparatus 200 of FIGS. 7A and 7B and the filtering apparatus 300 of FIG. 8.

Referring to FIG. 8, the filtering apparatus 300 may include the body 210 including a plurality of regions, and sizes of the hydrodynamic filters 100 included in the plurality of regions may be different from one another. Here, a size of each of the hydrodynamic filters 100 may be the first distance $d_1$ between the first protrusion 30 and the third protrusion 35 or the second distance $d_2$ between the second protrusion 40 and the fourth protrusion 45. In one embodiment, for example, a size of the hydrodynamic filter 100 disposed in a region near to the inlet portion 220 may be greater than or equal to a size of the hydrodynamic filter 100 disposed in a region near to the outlet portion 230. As illustrated in FIG. 8, the body 210 may include a first region 211, a second region 213 and a third region 215, and sizes of the hydrodynamic filters 100 included in the first region 211, the second region 213, and the third region 215 may be arranged in a decreasing or increasing order in the flow direction. That is, a size of the hydrodynamic filter 100 included in the first region 211 may be several hundred μm, a size of the hydrodynamic filter 100 included in the second region 213 may be several tens of μm, and a size of the hydrodynamic filter 100 included in the third region 215 may be several μm. Accordingly, the filtering apparatus 300 may capture target molecules with different sizes in different regions included in the body 210.

Figure 9A:
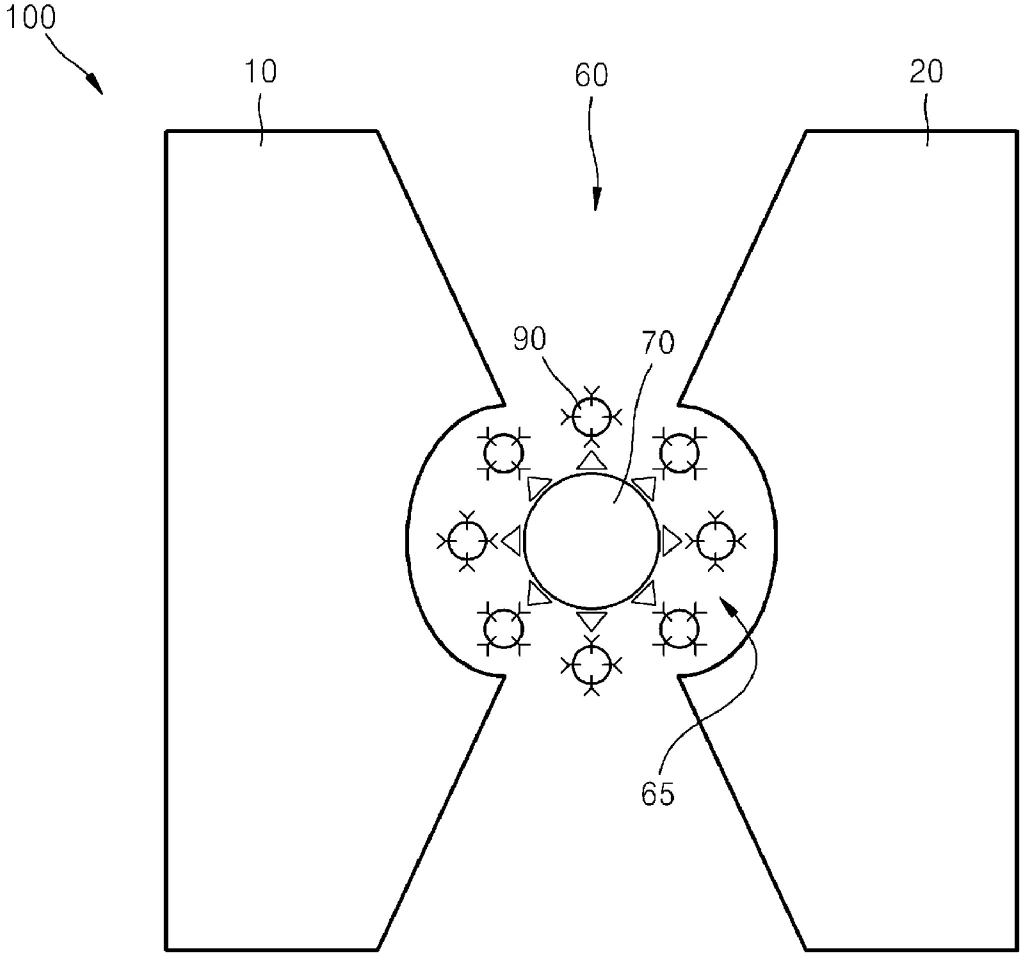
FIGS. 9A and 9B are plan views of the hydrodynamic filter of FIG. 1A for explaining a filtering method according to an embodiment of the present invention.
Figure 9B:
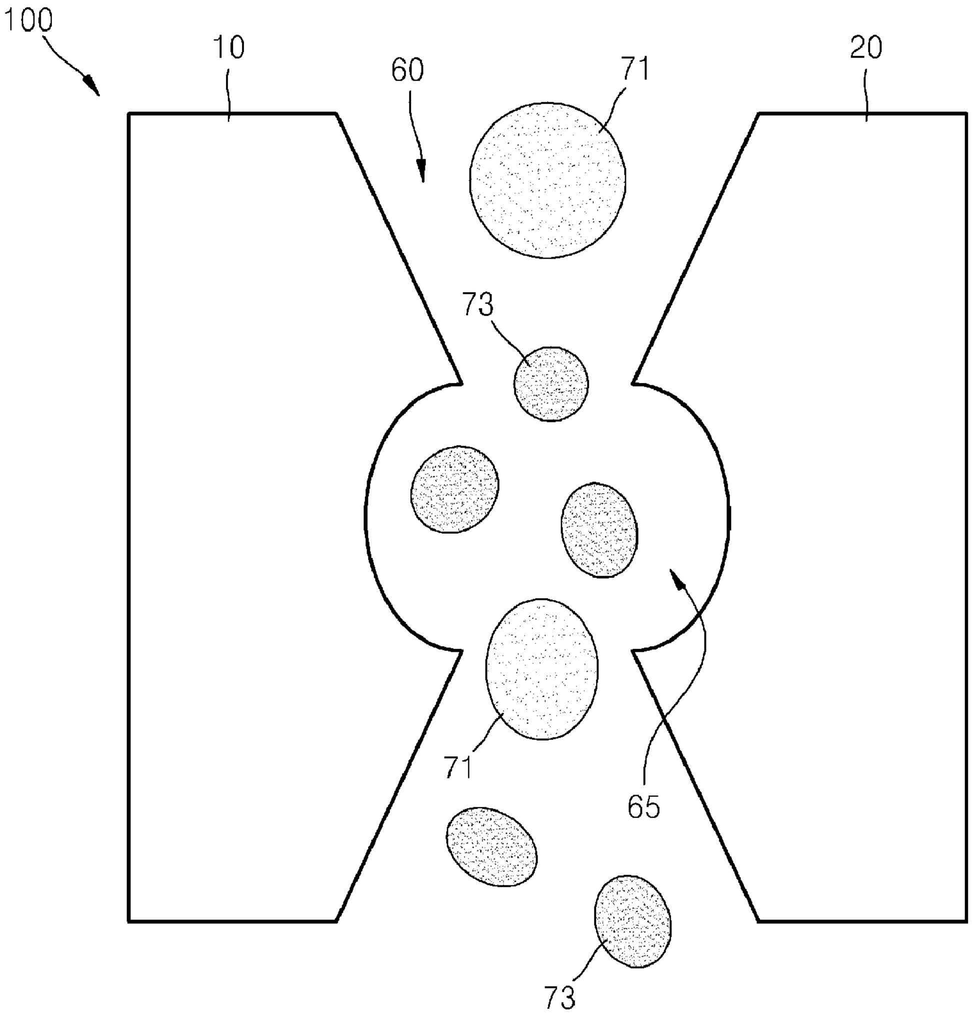

FIGS. 9A and 9B are plan views of the hydrodynamic filter 100 of FIG. 1A for explaining a filtering method according to an embodiment of the present invention.

The filtering method may include introducing a fluid including target molecules into any of the hydrodynamic filter 100, 110, 115, 120, and 130 shown in FIGS. 1A through 4, capturing the target molecules by any of the hydrodynamic filters 100, 110, 115, 120, and 130, and discharging a remaining part of the fluid without the captured target molecules to the outside of any of the hydrodynamic filters 100, 110, 115, 120, and 130.

Referring to FIG. 9A, the filtering method may further include, before the introducing of the fluid into any of the hydrodynamic filters 100, 110, 115, 120, and 130, attaching at least one bead 90 to the target molecules 70. The bead 90 may be selectively or specifically attached to only the target molecules 70. Sizes of the target molecules 70 to which the bead 90 is attached may be increased to make it more likely that the target molecules 70 are captured by the first capturing portion 60 or the second capturing portion 65. If the target molecules 70 are CTCs, since it is difficult to elastically deform cell membranes of the CTCs due to a plurality of beads 90 attached onto the CTCs, the captured CTCs to which the beads 90 are attached may rarely leak out of the second capturing portion 65.

Referring to FIG. 9B, since the bead 90 is not specific to other cells included in blood, for example, WBCs 71 or RBCs 73, the bead 90 is not attached to the other cells. Accordingly, WBCs 71 or RBCs 73 with sizes less than a size of the hydrodynamic filter 100 may pass without being filtered by the hydrodynamic filter 100. However, WBCs 71 with sizes greater than a size of the hydrodynamic filter 100 may be temporarily captured by the first capturing portion 60 or the second capturing portion 65. However, since WBCs 71 are surrounded by flexible cell membranes, the WBCs 71 are easily elastically deformed. Accordingly, when a pressure of a fluid introduced into the hydrodynamic filter 100 is increased, WBCs 71 with sizes greater than a size of the hydrodynamic filter 100 may be deformed and may easily leak out of the first capturing portion 60 or the second capturing portion 65.

Another filtering method may include introducing a fluid including target molecules through the inlet portion 220 into the body 210 of the filtering apparatus 200 shown in FIGS. 7A and 7B, capturing the target molecules by the hydrodynamic filter 100 (see FIG. 1) included in the body 210, and discharging a remaining part of the fluid without the target molecules to the outside of the filtering apparatus 200 through the outlet portion 230. Here, the filtering method may use the filtering apparatus 300 shown in FIG. 8, instead of the filtering apparatus 200 shown in FIGS. 7A and 7B.

Referring again to FIG. 9A, the filtering method may further include, before the introducing of the fluid into the filtering apparatus 200, attaching at least one bead 90 to the target molecules 70. The bead 90 may be selectively or specifically attached to only the target molecules 70. Sizes of the target molecules 70 to which the bead 90 is attached may be increased to make it more likely that the target molecules 70 are captured by the first capturing portion 60 or the second capturing portion 65. If the target molecules 70 are CTCs, since it is difficult to elastically deform cell membranes of the CTCs due to a plurality of the beads 90 attached to the CTCs, the captured CTCs to which the beads 90 are attached may not easily leak out of the second capturing portion 65.

Referring again to FIG. 9B, since the bead 90 is not specific to other cells included in blood, for example, WBCs 71 or RBCs 73, the bead 90 is not attached to the other cells. Accordingly, WBCs 71 or RBCs 73 with sizes less than a size of the hydrodynamic filter 100 may pass without being filtered by the hydrodynamic filter 100.

While the present invention has been particularly shown and described with reference to embodiments thereof using specific terms, the embodiments and terms have been used to explain the present invention and should not be construed as limiting the scope of the present invention formed by the claims. The embodiments should be considered in a descriptive sense only and not for purposes of limitation. Therefore, the scope of the invention is formed not by the detailed description of the invention but by the appended claims, and all differences within the scope will be construed as being included in the present invention.

What is claimed is:

1. A hydrodynamic filter comprising:

a first portion which comprises a plurality of protrusions protruding in a first direction;

a second portion which is spaced apart from the first portion and faces the first portion, and comprises a plurality of protrusions protruding in a second direction opposite to the first direction, wherein the plurality of protrusions of the second portion face the plurality of protrusions of the first portion;

wherein a surface the first portion between the plurality of protrusions of the first portion is curved and convex toward the first portion; and a surface of the second portion between the plurality of protrusions of the second portion is curved and convex toward the second portion.

2. The hydrodynamic filter of claim 1, wherein the plurality of protrusions of the first portion comprises a first protrusion and a second protrusion which are spaced apart from each other, and the plurality of protrusions of the second portion comprises a third protrusion and a fourth protrusion which are spaced apart from each other, and respectively face the first protrusion and the second protrusion.

3. The hydrodynamic filter of claim 1, wherein the plurality of protrusions of the first portion and the plurality of protrusions of the second portion are tapered toward distal ends thereof.

4. The hydrodynamic filter of claim 2, wherein a first distance between the first protrusion and the third protrusion ranges from about 5 micrometers to about 100 micrometers.

5. The hydrodynamic filter of claim 2, wherein a second distance between the second protrusion and the fourth protrusion ranges from about 5 micrometers to about 100 micrometers.

6. The hydrodynamic filter of claim 2, wherein a first distance between the first protrusion and the third protrusion is greater than or equal to a second distance between the second protrusion and the fourth protrusion.

7. The hydrodynamic filter of claim 2, wherein the first protrusion and the third protrusion are flexible such that the first and third flexible protrusions deform when a fluid including target molecules flow therebetween.

8. The hydrodynamic filter of claim 2, wherein the plurality of protrusions of the first portion further comprises a fifth protrusion which is spaced apart from the first and second protrusions, and the plurality of protrusions of the second portion further comprises a sixth protrusion which is spaced apart from the third and fourth protrusions, and faces the fifth protrusion.

9. The hydrodynamic filter of claim 8, wherein a third distance between the fifth protrusion and the sixth protrusion is less than or equal to a second distance between the second protrusion and the fourth protrusion.

10. A filtering apparatus comprising:

a body comprising a plurality of hydrodynamic filters, and in which a fluid including target molecules is filtered;

an inlet portion in connection with the body, and through which the fluid is introduced into the body; and an outlet portion in connection to the body, and through which the fluid filtered by the body is discharged from the body, wherein each of the plurality of the hydrodynamic filters comprises:

a first portion which comprises a plurality of protrusions protruding in a first direction;

a second portion which is spaced apart from the first portion and faces the first portion, and comprises a plurality of protrusions protruding in a second direction opposite to the first direction, wherein the plurality of protrusions of the second portion face the plurality of protrusions of the first portion;

wherein a surface the first portion between the plurality of protrusions of the first portion is curved and convex toward the first portion; and a surface of the second portion between the plurality of protrusions of the second portion is curved and convex toward the second portion.

11. The filtering apparatus of claim 10, wherein the plurality of hydrodynamic filters are aligned and form a hydrodynamic filter sequence.

12. The filtering apparatus of claim 10, wherein the plurality of hydrodynamic filters are arrayed.

13. The filtering apparatus of claim 11, further comprising a plurality of the hydrodynamic filter sequences, and wherein the plurality of hydrodynamic filter sequences are spaced apart from one another and are parallel to one another in a direction from the inlet portion to the outlet portion.

14. The filtering apparatus of claim 13, wherein distances between facing protrusions of the hydrodynamic filters of the plurality of the hydrodynamic filter sequences decrease in the direction from the inlet portion toward the outlet portion.

15. The filtering apparatus of claim 13, wherein the body further comprises a first side wall, and a second side wall opposite to the first side wall, and a first end of the plurality of the hydrodynamic filter sequences is adjacent to the first side wall of the body, and a second end opposite to the first end of the plurality of hydrodynamic filter sequences is adjacent to the second side wall of the body.

16. The filtering apparatus of claim 13, wherein the body further comprises a first side wall, and a second side wall opposite to the first side wall, and a first end of the plurality of the hydrodynamic filter sequences is adjacent to the first side wall of the body, and a second end opposite to the first end of the plurality of hydrodynamic filter sequences is spaced apart from the second side wall of the body.

17. The filtering apparatus of claim 13, wherein the body further comprises a first side wall, and a second side wall opposite to the first side wall, and the plurality of the hydrodynamic filter sequences comprises:

first hydrodynamic filter sequences of which a first end is adjacent to the first side wall of the body and a second end opposite to the first end is spaced apart from the second side wall of the body, and second hydrodynamic filter sequences of which a second end is adjacent to the second side wall of the body and a first end opposite to the second end is spaced apart from the first side wall of the body, wherein the first and second hydrodynamic filter sequences alternate in the direction from the inlet portion to the outlet portion.

18. A filtering method comprising:

introducing a fluid including target molecules into a hydrodynamic filter;

capturing the target molecules by the hydrodynamic filter; and discharging a remaining part of the fluid without the captured target molecules to an outside of the hydrodynamic filter, wherein the hydrodynamic filter comprises:

a first portion which comprises a plurality of protrusions protruding in a first direction;

a second portion which is spaced apart from the first portion and faces the first portion, and comprises a plurality of protrusions protruding in a second direction opposite to the first direction, wherein the plurality of protrusions of the second portion face the plurality of protrusions of the first portion;

wherein a surface the first portion between the plurality of protrusions of the first portion is curved and convex toward the first portion; and a surface of the second portion between the plurality of protrusions of the second portion is curved and convex toward the second portion.

19. The filtering method of claim 18, further comprising, before the introducing the fluid into the hydrodynamic filter, attaching beads to the target molecules.

20. A filtering method comprising:

introducing a fluid including target molecules through an inlet portion of a filtering apparatus and into a body of the filtering apparatus;

capturing the target molecules by a hydrodynamic filter in the body; and discharging a remaining part of the fluid without the captured target molecules to an outside of the filtering apparatus through an outlet portion, wherein the filtering apparatus comprises:

the body comprising a plurality of the hydrodynamic filters, and in which the fluid including the target molecules is filtered;

the inlet portion in connection with the body, and through which the fluid is introduced into the body; and the outlet portion in connection to the body, and through which the fluid filtered by the body is discharged from the body, and the hydrodynamic filter comprises:

a first portion which comprises a plurality of protrusions protruding in a first direction;

a second portion which is spaced apart from the first portion and faces the first portion, and comprises a plurality of protrusions protruding in a second direction opposite to the first direction, wherein the plurality of protrusions of the second portion face the plurality of protrusions of the first portion;

wherein a surface the first portion between the plurality of protrusions of the first portion is curved and convex toward the first portion; and a surface of the second portion between the plurality of protrusions of the second portion is curved and convex toward the second portion.

21. The filtering method of claim 20, further comprising, before the introducing the fluid into the filtering apparatus, attaching beads to the target molecules.

22. A hydrodynamic filter apparatus comprising:

a plurality of hydrodynamic filters each comprising:

a first side wall portion and a second side wall portion which face each other, each side wall portion including a first protrusion, a second protrusion, and a curved surface located between the first protrusion and the second protrusion, wherein the curved surface is convex toward the respective side wall portion; and a fluid flow path which is between the first and second side wall portions and through which the fluid including target molecules flows in a fluid flow direction, wherein a width of the fluid flow path is taken perpendicular to the fluid flow direction, wherein the fluid flow path comprises:

a first constricted width which is defined by first protrusions which face each other, and at which movement in the fluid flow direction of target molecules of a first size is restricted, and a second constricted width which is defined by second protrusions which face each other, is spaced apart from the first constricted width, and at which movement in the fluid flow direction of target molecules of a second size is restricted.

23. The hydrodynamic filter apparatus of claim 22, further comprising a plurality of hydrodynamic filter sequences which are arranged in the fluid flow direction, wherein each of the hydrodynamic filter sequences comprises the plurality of hydrodynamic filters;

wherein the first and second side wall portions of a portion of the plurality of hydrodynamic filters each further comprise a third protrusion, and the fluid flow path of the portion of the plurality of hydrodynamic filters further comprises a third constricted width which is defined by third protrusions which face each other, is spaced apart from the first and second constricted widths, and at which movement in the fluid flow direction of target molecules of a third size is restricted.

* * * * *